US009655019B2

(12) United States Patent
Kim (10) Patent No.: US 9,655,019 B2
(45) Date of Patent: May 16, 2017

(54) APPARATUS AND METHOD FOR SWITCHING CALL IN MOBILE COMMUNICATION SYSTEM (71) Applicant: Samsung Electronics Co. Ltd., Suwon-si, Gyeonggi-do (KR)

(72) Inventor: Hye-Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 14/044,198

(22) Filed: Oct. 2, 2013

(65) Prior Publication Data
US 2014/0098787 A1 Apr. 10, 2014

(30) Foreign Application Priority Data

Oct. 8, 2012 (KR) ........................ 10-2012-0111566

(51) Int. Cl.
*H04W 4/00* (2009.01)
*H04W 36/14* (2009.01)
*H04W 36/00* (2009.01)
*H04W 48/20* (2009.01)
*H04W 48/18* (2009.01)

(52) U.S. Cl.
CPC ....... *H04W 36/14* (2013.01); *H04W 36/0022* (2013.01); *H04W 48/18* (2013.01); *H04W 48/20* (2013.01)

(58) Field of Classification Search
CPC . H04W 36/14; H04W 36/0022; H04W 48/18; H04W 48/20
See application file for complete search history.

(56) References Cited

U.S. PATENT DOCUMENTS

| | | | | |
|---|---|---|---|---|
| 2007/0123259 A1* | 5/2007 | Huang | ........... | H04W 36/18 455/436 |
| 2010/0111002 A1 | 5/2010 | Xu et al. | | |
| 2010/0272049 A1* | 10/2010 | Tung | ........... | H04W 88/06 370/329 |
| 2012/0057569 A1* | 3/2012 | Xie | ........... | H04W 36/385 370/331 |
| 2012/0257549 A1* | 10/2012 | Chin | ........... | H04W 36/14 370/280 |
| 2012/0258707 A1* | 10/2012 | Mathias | ........... | H04W 36/30 455/426.1 |

* cited by examiner

*Primary Examiner* — Lonnie Sweet
(74) *Attorney, Agent, or Firm* — Jefferson IP Law, LLP (57) ABSTRACT A method for switching a call by a User Equipment (UE) supporting a Voice Call Continuity (VCC) scheme in a mobile communication system is provided. The method includes detecting that there is a need for switching a voice call from a first access network to a second access network that is different from the first access network while the UE supporting the VCC scheme transmits/receives data in the first access network through an old bearer which is set up with the other party UE, performing a new bearer set up operation with the second access network, and transmitting/receiving voice data with the other party UE through the old bearer in the first access network and transmitting/receiving voice data with the other party UE through the new bearer in the second access network until a point in time.

14 Claims, 10 Drawing Sheets

APPARATUS AND METHOD FOR SWITCHING CALL IN MOBILE COMMUNICATION SYSTEM

CROSS-REFERENCE TO RELATED APPLICATION(S)

This application claims the benefit under 35 U.S.C. §119 (a) of a Korean patent application filed on Oct. 8, 2012 in the Korean Intellectual Property Office and assigned Serial No. 10-2012-0111566, the entire disclosure of which is hereby incorporated by reference.

TECHNICAL FIELD

The present disclosure relates to an apparatus and method for switching a call in a mobile communication system. More particularly, the present disclosure relates to an apparatus and method for switching a voice call in a mobile communication system supporting a Dual Radio Voice Call Continuity (DRVCC) scheme.

BACKGROUND

If a new mobile communication scheme such as a Long-Term Evolution (LTE) scheme, a Long-Term Evolution-Advanced (LTE-A) scheme, or the like, is introduced in a mobile communication scheme, the mobile communication scheme provides a limited service coverage area during an interval before establishing a whole network. If a network in which the new mobile communication scheme is introduced supports a Voice over Internet Protocol (VoIP) service, a voice call which a User Equipment (UE) receives is terminated due to a limitation of service coverage area when the UE moves out of the service coverage area.

In order to address this problem, a 3rd Generation Partnership Project (3GPP) standard has defined a Voice Call Continuity (VCC) scheme in which a UE may maintain a voice call through a voice handover between a new Packet Switching (PS) network and an old Circuit Switching (CS) network which has a relative large service coverage area even though the UE moves out of the service coverage area.

The VCC scheme defined in the 3GPP standard is based on a dual radio scheme. That is, the VCC scheme defined in the 3GPP standard assumes a UE which may simultaneously access and communicate with two different access networks, e.g., a PS access network and a CS access network, and defines a process provide continuity for a voice call if the UE hands over to the CS access network while receiving the voice call in the PS access network, or the UE hands over to the PS access network while receiving the voice call in the CS access network.

First, upon determining that there is a need for a voice handover from an access network, which a UE supporting the dual radio scheme currently accesses, to a new access network, the UE supporting the dual radio scheme transmits a message which requests a domain transfer to an Internet Protocol (IP) Multimedia Subsystem (IMS) server through the new access network.

If the new access network is the CS network, the UE supporting the dual radio scheme uses a CS setup message as the message which requests the domain transfer. If the new access network is the PS network, the UE supporting the dual radio scheme uses a Session Initiation Protocol (SIP) invite request message as the message which requests the domain transfer.

The IP Multimedia Subsystem (IMS) server connects a new bearer to the UE supporting the dual radio scheme through the new access network, and performs a domain transfer operation which switches a data path from an old bearer to a new bearer. Upon completing the new bearer connection, the IMS server notifies the UE that the domain transfer operation has completed by transmitting a SIP bye request message or a CS connection release message to the UE.

Figure 1A:
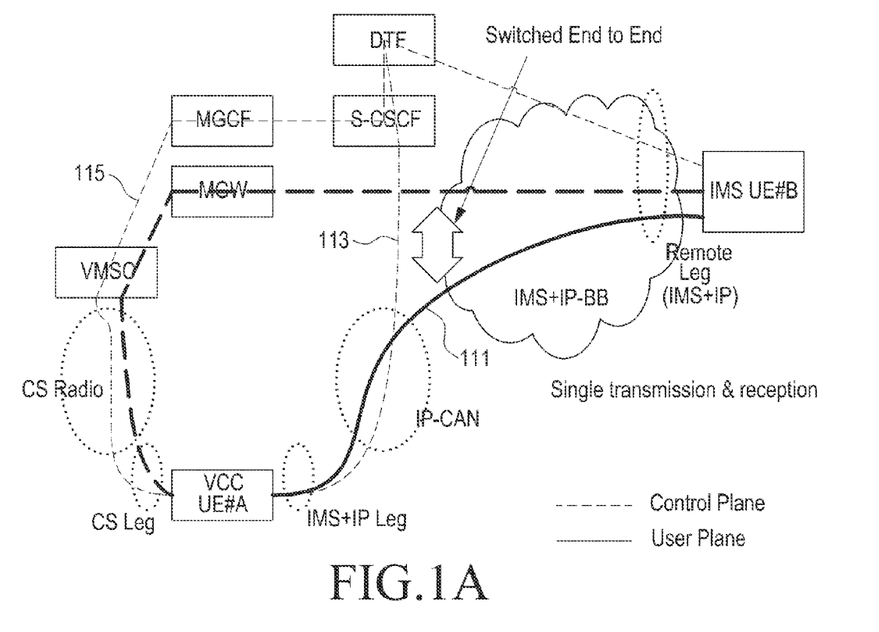
FIGS. 1A and 1B schematically illustrate a method for switching a voice call for a Voice Call Continuity (VCC) User Equipment (UE) in a case in which another party UE is an Internet Protocol (IP) Multimedia Subsystem (IMS) UE in a conventional mobile communication system according to the related art.
Figure 1B:
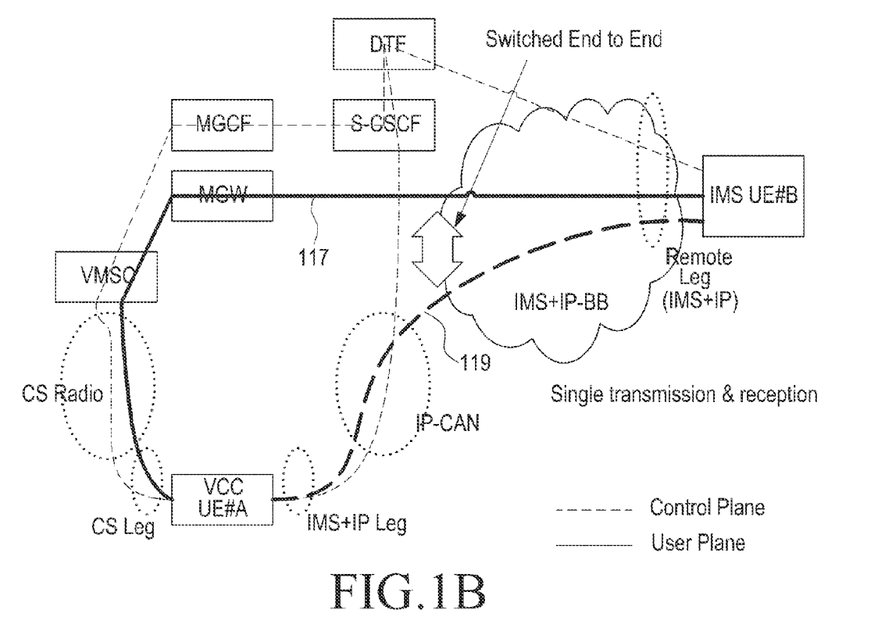

FIGS. 1A and 1B schematically illustrate a method for switching a voice call for a VCC UE in a case in which another party UE is an IMS UE in a conventional mobile communication system according to the related art.

Referring to FIGS. 1A and 1B, the IMS UE denotes a UE supporting an IMS scheme, and the VCC UE denotes a UE supporting the VCC scheme. The conventional mobile communication system includes a Domain Transfer Function (DTF) entity, a Media Gateway Control Function (MGCF) entity, a Serving-Call State Control Function (S-CSCF) entity, a Media Gate Way (MGW), a Visited Mobile Switching Center (VMSC), a VCC UE #A and an IMS UE #B.

As described in FIG. 1A, if the VCC UE #A detects that there is a need for switching a voice call during a voice call service operation with the other party UE, i.e., the IMS UE #B (111), the VCC UE #A transmits a message which requests domain transfer to the DTF entity. After receiving the message which requests the domain transfer from the VCC UE #A, the DTF entity transmits a message which indicates that the VCC UE #A requested the domain transfer to an IMS server (not shown in FIGS. 1A to 1B) (113). After receiving the message which indicates that the VCC UE #A requested the domain transfer from the IMS server, the IMS server performs a control operation in which the IMS server connects a new bearer to the VCC UE #A (115).

As described in FIG. 1B, after the new bearer between the IMS UE #B and the VCC UE #A is connected, a connection between the IMS UE #B and the VCC UE #A is performed through the new bearer between the IMS UE #B and the VCC UE #A (117), and a connection between the IMS UE #B and the VCC UE #A through an old bearer is terminated (119).

Figure 2A:
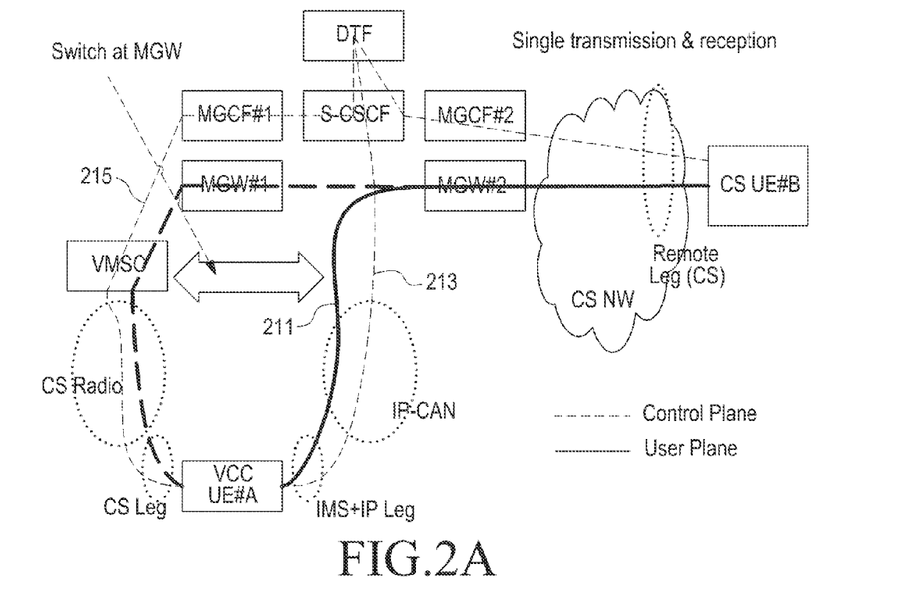
FIGS. 2A and 2B schematically illustrate a method for switching a voice call for a VCC UE in a case in which another party UE is a Circuit Switching (CS) UE in a conventional mobile communication system according to the related art.
Figure 2B:
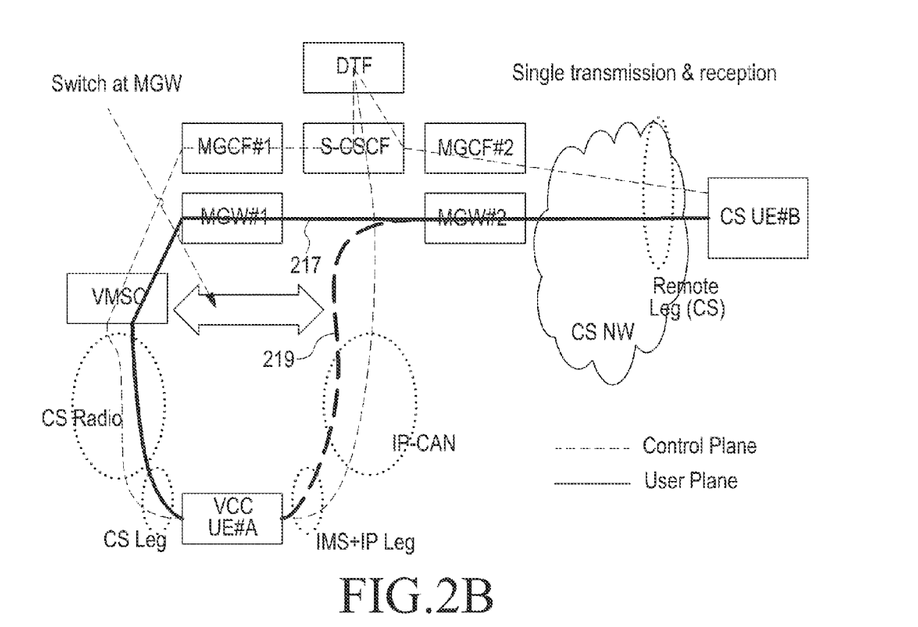

FIGS. 2A and 2B schematically illustrate a method for switching a voice call for a VCC UE in a case in which another party UE is a CS UE in a mobile communication system according to the related art.

Referring to FIGS. 2A and 2B, the CS UE denotes a UE supporting a CS scheme. The mobile communication system includes a DTF entity, an MGCF #1 entity, an S-CSCF entity, an MGCF #2 entity, an MGW #1, an MGW #2, a VMSC, a VCC UE #A and a CS UE #B.

As described in FIG. 2A, if the VCC UE #A detects that there is a need for switching a voice call during a voice call service operation with the other party UE, i.e., the CS UE #B (211), the VCC UE #A transmits a message which requests domain transfer to the DTF entity. After receiving the message which requests the domain transfer from the VCC UE #A, the DTF entity transmits a message which indicates that the VCC UE #A requested the domain transfer to an IMS server (not shown in FIGS. 2A to 2B) (213). After receiving the message which indicates that the VCC UE #A has requested the domain transfer from the IMS server, the IMS server performs a control operation in which the IMS server connects a new bearer to the VCC UE #A (215).

As described in FIG. 2B, after the new bearer between the CS UE #B and the VCC UE #A is connected, a connection between the CS UE #B and the VCC UE #A is performed through the new bearer between the CS UE #B and the VCC UE #A (217), and a connection between the CS UE #B and the VCC UE #A through an old bearer is terminated (219).

As described above, FIGS. 1A and 1B illustrate a User-plane (U-plane) path (data transmission path) and a switching point through a CS access network and a PS access network if the other party UE is an IMS UE, and FIGS. 2A to 2B illustrate a U-plane path (data transmission path) and a switching point through a CS access network and a PS access network if the other party UE is a CS UE.

If a UE supporting a DRVCC scheme performs a domain transfer operation, an anchor point which switches a path in a network may be changed according to whether the other party UE is a CS UE or a PS UE. That is, if the other party UE is the CS UE, an MGW for the UE supporting the DRVCC scheme becomes the anchor point. On the other hand, if the other party UE is the IMS UE, an MGW for the other party UE or an end point of an Internet Protocol Connectivity Access Network (IP-CAN) becomes the anchor point. The end point of the IP-CAN may be a Packet Gate Way (PGW) or a Gateway General Packet Radio Service (GPRS) Support Node (GGSN) according to the kind of access network involved.

As described above, in the DRVCC scheme, a domain transfer operation in which a voice data transmitting/receiving path is switched from an old bearer to a new bearer on a network, and an operation in which a voice data transmitting/receiving path is switched between two access networks within a UE are independently performed. That is, the UE may not know when a domain transfer occurs after a new bearer is connected.

In a currently proposed standard, it is not defined when a UE switches a path for transmitting/receiving voice data. So, the UE merely infers that the path for transmitting/receiving the voice data is switched from the old access network to the new access network upon receiving a SIP bye request message or a CS connection release message.

However, if a switching point in the access networks is not identical to a switching point in the UE, data loss necessarily occurs. That is, e.g., even though the switching point in the access networks is identical to the switching point in the UE, data loss occurs due to basic transmission delay between the UE and the access networks. Further, if the switching point in the access networks is not identical to the switching point in the UE, data loss quantity increases. For example, if a Node B transmits voice data through a new path and the UE receives the voice data through an old path, data loss occurs.

This means that, if voice data is lost while a voice service is provided in the mobile communication system, a voice call is dropped, so voice quality of the voice service deteriorates.

In the related art, an interval in which a domain transfer operation is performed in the mobile communication system is expected to be about 800~1000 msecs according to the kind of and the particular situation of the access network, and an interval in which data loss may occur is expected to be tens to hundreds of msecs according to a gap between data path switching time for an access network and data path switching time for a UE. The data loss interval of tens to hundreds of msecs is time during which the user of the UE may recognize and experience discomfort.

Therefore, a need exists for a method and an apparatus for effectively switching a voice call in a mobile communication system that supports a DRVCC scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for switching a call in a mobile communication system.

Another aspect of the present disclosure is to provide an apparatus and method for switching a voice call in a mobile communication system.

Yet another aspect of the present disclosure is to provide an apparatus and method for switching a call in a mobile communication system thereby preventing a voice clipping.

Still another aspect of the present disclosure is to provide an apparatus and method for switching a voice call in a mobile communication system whereby a User Equipment (UE) simultaneously transmits/receives voice data through an old bearer and a new bearer during a domain transfer interval and stops transmitting/receiving the voice data through the old bearer at a point in time at which the domain transfer interval is terminated.

In accordance with an aspect of the present disclosure, a User Equipment (UE) supporting a Voice Call Continuity (VCC) scheme in a mobile communication system is provided. The UE includes a Dual Radio Voice Call Continuity (DRVCC) controller configured to detect that there is a need for switching a voice call from a first access network to a second access network that is different from the first access network while the UE supporting the VCC scheme transmits/receives data in the first access network through an old bearer which is set up with the other party UE, and a MOdulator/DEModulator (MODEM) configured to perform a new bearer set up operation with the second access network, and to transmit/receive voice data with the other party UE through the old bearer in the first access network and to transmit/receive voice data with the other party UE through the new bearer in the second access network until a point in time.

In accordance with another aspect of the present disclosure, an anchor point for switching a call for a UE supporting a VCC scheme in a mobile communication system is provided. The anchor point includes a MODEM configured to receive a voice call switching request message transmitted from the UE supporting the VCC scheme when the UE supporting the VCC scheme detects that there is a need for switching a voice call from a first access network to a second access network that is different from the first access network while the UE supporting the VCC scheme transmits/receives data in the first access network through an old bearer which is set up with the other party UE, and to detect that a new bearer has been set up for the UE supporting the VCC scheme in the second access network, and a DRVCC controller configured to control the UE supporting the VCC scheme to transmit/receive voice data with the other party UE through the old bearer in the first access network and to transmit/receive voice data with the other party UE through the new bearer in the second access network until a point in time.

In accordance with another aspect of the present disclosure, a method for switching a call by a UE supporting a VCC scheme in a mobile communication system is provided. The method includes detecting that there is a need for switching a voice call from a first access network to a second access network that is different from the first access network while the UE supporting the VCC scheme transmits/receives data in the first access network through an old bearer which is set up with the other party UE, performing a new bearer set up operation with the second access network, and transmitting/receiving voice data with the other party UE through the old bearer in the first access network and transmitting/receiving voice data with the other party UE through the new bearer in the second access network until a point in time.

In accordance with another aspect of the present disclosure, a method for switching a call for a UE supporting a VCC scheme by an anchor point in a mobile communication system is provided. The method includes receiving a voice call switching request message transmitted from the UE supporting the VCC scheme according that the UE supporting the VCC scheme detects that there is a need for switching a voice call from a first access network to a second access network that is different from the first access network while the UE supporting the VCC scheme transmits/receives data in the first access network through an old bearer which is set up with the other party UE, detecting that a new bearer has been set up for the UE supporting the VCC scheme in the second access network, and controlling the UE supporting the VCC scheme to transmit/receive voice data with the other party UE through the old bearer in the first access network and transmit/receive voice data with the other party UE through the new bearer in the second access network until a point in time.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An embodiment of the present disclosure proposes an apparatus and method for switching a call in a mobile communication system.

Further, an embodiment of the present disclosure proposes an apparatus and method for switching a voice call in a mobile communication system.

Further, an embodiment of the present disclosure proposes an apparatus and method for switching a call in a mobile communication system thereby preventing a voice clipping.

Further, an embodiment of the present disclosure proposes an apparatus and method for switching a voice call in a mobile communication system thereby a User Equipment (UE) simultaneously transmits/receives voice data through an old bearer and a new bearer during a domain transfer interval and stops transmitting/receiving the voice data through the old bearer at the point in time at which the domain transfer interval is terminated. The domain transfer interval denotes a time interval from a point in time at which a domain transfer operation starts to a point in time at which the domain transfer operation is completed.

An apparatus and method proposed in an embodiment of the present disclosure will be described herein with reference to a mobile communication system supporting a Dual Radio Voice Call Continuity (DRVCC) scheme.

Further, an apparatus and method proposed in an embodiment of the present disclosure will be described with reference to a 3rd Generation Partnership Project (3GPP) Long Term Evolution (LTE) mobile communication system and a Code Division Multiple Access 1× (CDMA1×) mobile communication system. However, an apparatus and method proposed in an embodiment of the present disclosure may be applied to various mobile communication systems such as a World Interoperability for Microwave Access (WiMAX) mobile communication system, a Wireless-Fidelity (WiFi) mobile communication system, a Global System for Mobile communications (GSM) mobile communication system, and a Wideband Code Division Multiple Access (WCDMA) mobile communication system as well as the 3GPP LTE mobile communication system and the CDMA1× mobile communication system.

A UE for performing a voice call switching method proposed in an embodiment of the present disclosure includes a DRVCC controller for performing the voice call switching method proposed in the embodiment of the present disclosure, two MOdulator/DEModulator (MODEM) PHYsical (PHY) processors and two MODEM protocol processors which may access two access networks, two VOice CODERs (VOCODERs), a switch for selecting reception data, and an audio input controller for simultaneously transferring transmission data to the two VOCODERs.

In an embodiment of the present disclosure, a domain transfer data path switching entity of an access network may be varied according to a kind of the access network such as a Media Gate Way (MGW) or a Packet Gate Way (PGW), and a Gateway General Packet Radio Service (GPRS) Support Node (GGSN), a kind of the other party UE, and a kind of an access network for the other party UE. It can be noted that a process is the same even though a kind of an entity is varied.

The DRVCC controller includes a user data controller #1 for transmitting data of a UE #1, e.g., a VCC UE to a UE #2, e.g., a remote end, i.e., the other party UE, and a user data controller #2 for transmitting data of the UE #2 to the UE #1. The VCC UE denotes a UE supporting a Voice Call Continuity (VCC) scheme. The user data controller #1 simultaneously receives data from two access networks, selects data among the received data according to a criterion proposed in an embodiment of the present disclosure, and transmits the selected data to the UE #2. The user data controller #2 transmits the data received from the UE #2 to one of an access network #1 and an access network #2 or simultaneously transmits the data received from the UE #2 to the access network #1 and the access network #2 according to a criterion proposed in an embodiment of the present disclosure.

Figure 3A:
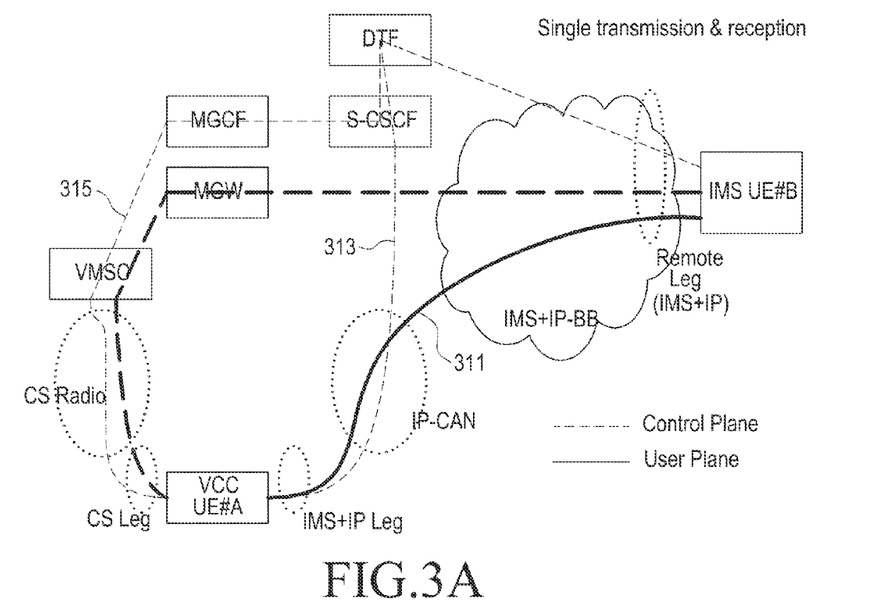
FIGS. 3A, 3B and 3C schematically illustrate a method for switching a voice call for a VCC UE in a case in which another party UE is an IMS UE in a mobile communication system according to an embodiment of the present disclosure.
Figure 3B:
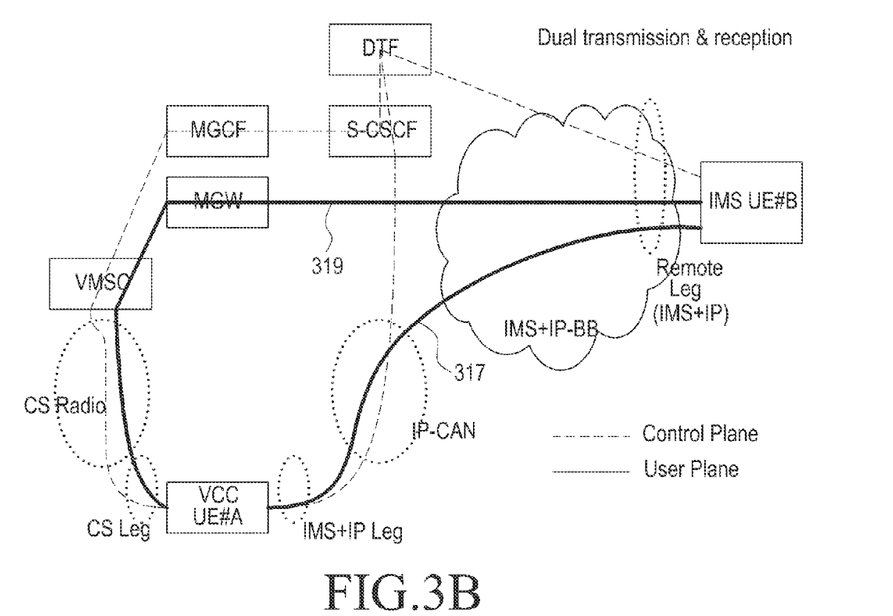
Figure 3C:
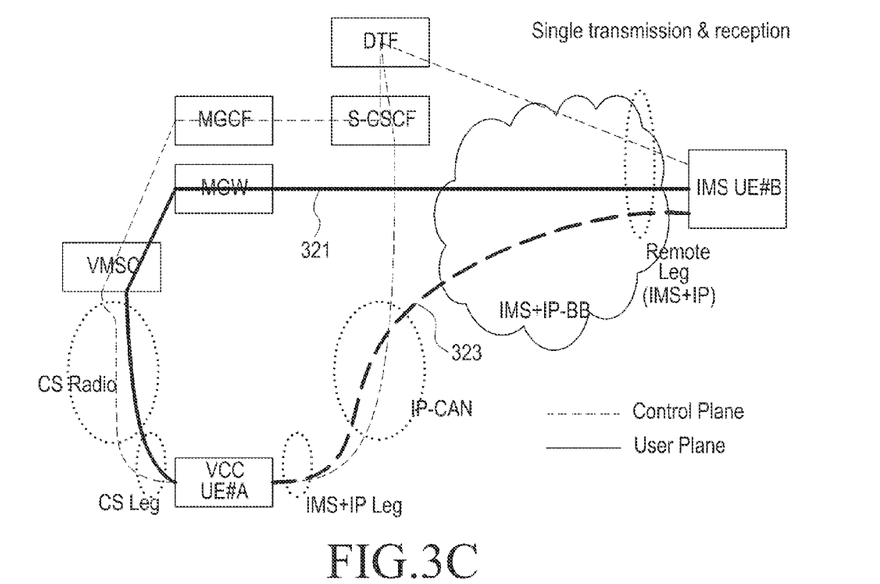

FIGS. 3A, 3B and 3C schematically illustrate a method for switching a voice call for a Voice Call Continuity (VCC UE) in a case in which another party UE is an Internet Protocol (IP) Multimedia Subsystem (IMS) UE in a mobile communication system according to an embodiment of the present disclosure.

Referring to FIGS. 3A, 3B and 3C, the IMS UE denotes a UE supporting an IMS scheme. The mobile communication system includes a Domain Transfer Function (DTF) entity, a Media Gateway Control Function (MGCF) entity, a Serving-Call State Control Function (S-CSCF) entity, an MGW, a Visited Mobile Switching Center (VMSC), a VCC UE #A and an IMS UE #B.

As described in FIG. 3A, if the VCC UE #A detects that there is a need for switching a voice call during a voice call service operation with the other party UE, i.e., the IMS UE #B (311), the VCC UE #A transmits a message which requests a domain transfer to the DTF entity. After receiving the message which requests the domain transfer from the VCC UE #A, the DTF entity transmits a message which indicates that the VCC UE #A requested the domain transfer to an IMS server (not shown in FIGS. 3A to 3C) (313). After receiving the message which indicates that the VCC UE #A requested the domain transfer from the IMS server, the IMS server performs a control operation in which the IMS server connects a new bearer to the VCC UE #A (315).

As described in FIG. 3B, during the domain transfer operation, the VCC UE #A performs a voice data transmission/reception operation with the IMS UE #B through an old bearer and the new bearer (317 and 319).

Upon detecting that valid data is transferred through the new bearer between the IMS UE #B and the VCC UE #A while the VCC UE #A performs the voice data transmission/reception operation with the IMS UE #B through the old bearer and the new bearer, the VCC UE #A performs a communication with the IMS UE #B through the new bearer (321), and does not process data received from the old bearer as valid data (323). The validity of data will be described below, and thus a detailed description thereof will be omitted herein.

Figure 4A:
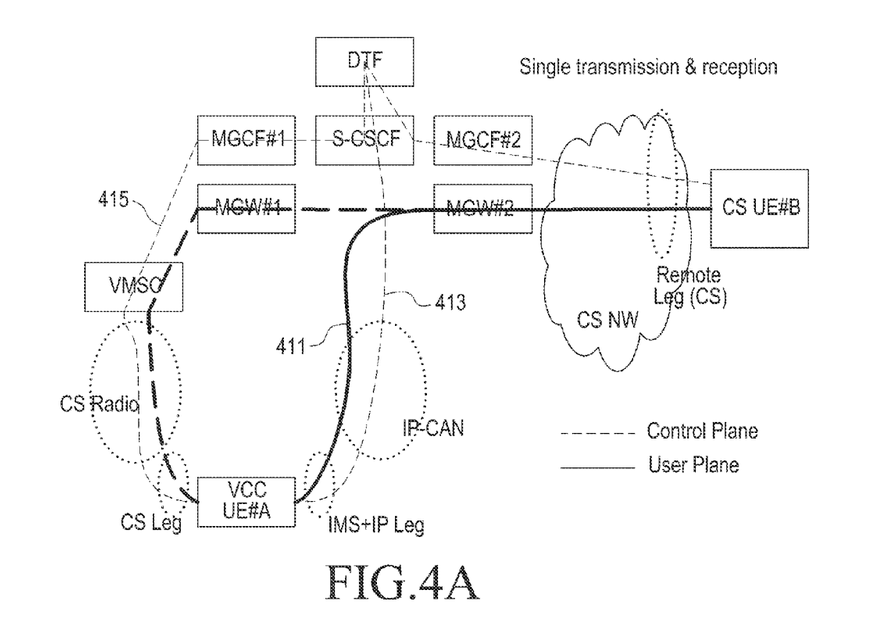
FIGS. 4A, 4B and 4C schematically illustrate a method for switching a voice call for a VCC UE in a case in which another party UE is a CS UE in a mobile communication system according to an embodiment of the present disclosure.
Figure 4B:
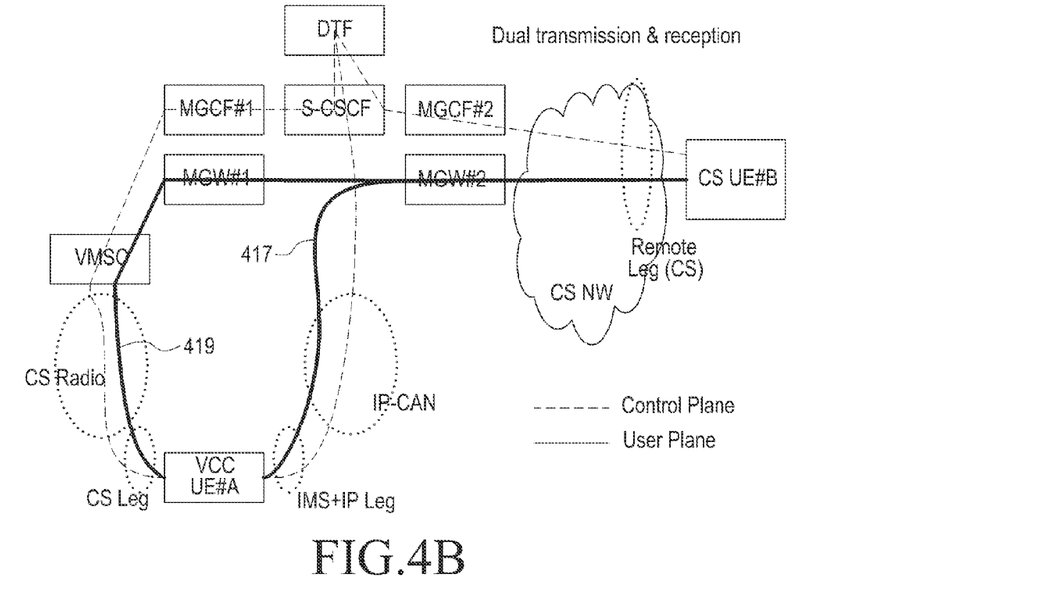
Figure 4C:
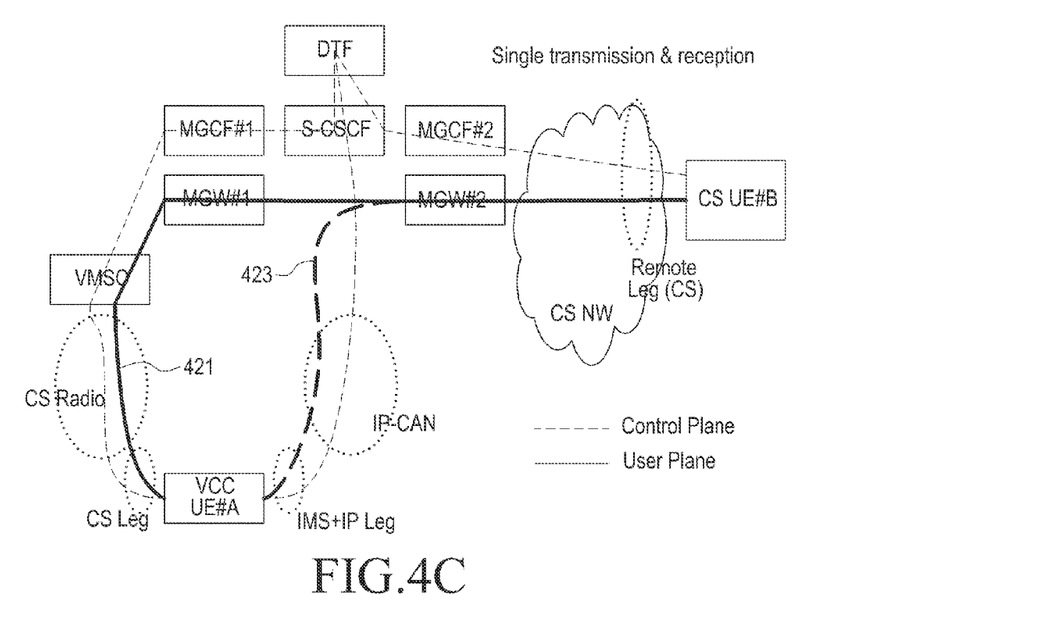

FIGS. 4A, 4B and 4C schematically illustrate a method for switching a voice call for a VCC UE in a case in which another party UE is a Circuit Switching (CS) UE in a mobile communication system according to an embodiment of the present disclosure.

Referring to FIGS. 4A, 4B and 4C, the mobile communication system includes a DTF entity, an MGCF #1 entity, an S-CSCF entity, an MGCF #2 entity, an MGW #1, an MGW #2, a VMSC, a VCC UE #A and a CS UE #B.

As described in FIG. 4A, if the VCC UE #A detects that there is a need for switching a voice call during a voice call service operation with the other party UE, i.e., the CS UE #B (411), the VCC UE #A transmits a message which requests domain transfer to the DTF entity. After receiving the message which requests the domain transfer from the VCC UE #A, the DTF entity transmits a message which indicates that the VCC UE #A requested the domain transfer to an IMS server (not shown in FIGS. 4A to 4C) (413). After receiving the message which indicates that the VCC UE #A requested the domain transfer from the IMS server, the IMS server performs a control operation in which the IMS server connects a new bearer to the VCC UE #A (415).

As described in FIG. 4B, during the domain transfer operation, the VCC UE #A performs a voice data transmission/reception operation with the CS UE #B through an old bearer and the new bearer (417 and 419).

Referring to FIG. 4C, upon detecting that valid data is transferred through the new bearer between the CS UE #B and the VCC UE #A while the VCC UE #A performs the voice data transmission/reception operation with the CS UE

B through the old bearer and the new bearer, the VCC UE #A performs a communication with the CS UE #B through the new bearer (421), and does not process data received from the old bearer as valid data (423).

The method for switching the voice call according to an embodiment of the present disclosure in FIGS. 3A, 3B and 3C, and 4A, 4B and 4C will be summarized below.

Firstly, if a bearer is set up in a CS domain and a Packet Switching (PS) domain, a VCC UE simultaneously transmits input voice data to the two bearers. Upon detecting that a domain transfer operation has been completed, the VCC UE stops data transmission to an old access network through an old bearer. The VCC UE simultaneously receives data from the two bearers, and outputs one of data received from the old access network and data received from a new access network. The data output from the VCC UE is determined corresponding to whether a domain transfer operation completion is detected and detection of data validity.

For example, upon detecting a beginning of receiving valid voice data from a new access network, the VCC UE stops processing voice data received from an old access network as valid voice data and uses voice data received from the new access network. That is, if the VCC UE detects that the valid voice data is received through the new bearer during a reception of the voice data through the old bearer, the VCC UE stops processing the voice data received from the old access network as the valid voice data and processes only the voice data received from the new access network as the valid voice data.

A point in time from a transmission/reception end of the VCC UE starts simultaneously transmitting/receiving voice data with an old access network and a new access network is a point in time at which a traffic channel which the transmission/reception end of the VCC UE may transmit the voice data to the new access network has been set up. A point in time at the VCC UE stops transmitting/receiving the voice data with the old access network is determined based on whether a domain transfer operation has been completed and whether the voice data is valid.

The VCC UE may determine the domain transfer operation completion corresponding to a Session Initiation Protocol (SIP) bye request message received from an access network or whether a CS connection release message is received.

The VCC UE determines a validity of voice data received through a related bearer corresponding to whether the received voice data is voice data transmitted from the other party UE. The validity of the voice data is determined in a MODEM PHY processor, a MODEM protocol processor, and a MODEM VOCODER. For example, the VCC UE may determine that valid voice data received if data of which a Cyclic Redundancy Check (CRC) result in a decoder included in the MODEM PHY processor is good is received, the MODEM protocol processor may determine the data as voice data, and the MODEM VOCODER may decode the data.

Upon simultaneously receiving valid voice data form an old access network and a new access network, a reception end of the VCC UE uses the voice data received from the old access network, and uses the voice data received from the new access network by performing a switching operation from the old access network to the new access network at a specific point in time. For example, the point in time at which the reception end of the VCC UE performs the switching operation may be set as one of a point in time at which the reception end of the VCC UE starts receiving valid voice data from the new access network and a point in time after a time from the point in time at which the reception end of the VCC UE starts receiving the valid voice data from the new access network, or may be determined by considering a reception performance for the old access network and the new access network such as a Received Signal Strength Indication (RSSI), Bit Error Rate (BER), etc.

Even though the VCC UE performed the switching operation, the VCC UE may maintain voice data reception from the old access network for a time, and use voice data received from the old access network if an error occurs in voice data received from the new access network.

As a result, a point in time at which the VCC UE stops receiving voice data from the old access network may be determined based on whether valid voice data is received from the old access network and a time after the VCC UE receives domain transfer complete information from the new access network.

In a case in which a CS access network and a PS access network use the same COder/DECoder (CODEC), the VCC UE should simultaneously support two VOCODERS, and a voice data switching point is a point at which Pulse Code Modulation (PCM) data is transferred to an audio CODEC. A MODEM which simultaneously supports the CS access network and the PS access network may include a switch within the MODEM, or equip a HardWare (HW) outside of the MODEM, or use a switch included in the audio CODEC.

If a bearer is connected to a new access network, the transmission end of the VCC UE simultaneously transmits voice data to an old access network and the new access network. A point in time at which the VCC UE stops receiving voice data from the old access network may be basically a domain transfer operation complete point in time. However, in the PS access network, the VCC UE may maintain voice data transmission to the old access network during a time after completing a domain transfer operation by considering a network transmission delay. On the other hand, the CS access network releases a channel at a domain transfer operation completion point in time, so the CS access network may not transmit voice data to the old access network.

The VCC UE may consider a kind of an access network upon determining a switching point in time for an access network.

The VCC scheme is generally performed at a service coverage area boundary region of a PS access network where a transmission/reception performance of the PS access network is generally bad. Therefore, in an embodiment of the present disclosure, to address this situation, the VCC UE allocates a relatively high priority to the CS access network, and rapidly performs a switching operation to the CS access network by advancing a switching point in time from the PS access network to the CS access network in VCC switching from the PS access network to the CS access network (PS to CS VCC). On the other hand, in VCC switching from the CS access network to the PS access network (CS to PS VCC), the VCC UE may perform a switching operation from the CS access network to the PS access network after obtaining stability for the PS access network by setting a switching point in time as a point in time after a time from a point in time at which a domain transfer operation has been completed not the point in time at which the domain transfer operation has been completed.

Further, transmission delay of the PS access network may be different from transmission delay of the CS access network and there is an individual processor for processing an Internet Protocol (IP) packet such as a jitter buffer, so the VCC UE may consider this case upon switching received voice data. If the PS access network and the CS access network use the same CODEC, the VCC UE receives the same voice data from the PS access network and the CS access network, so the VCC UE easily identifies the voice data. On the other hand, if the PS access network and the CS access network use different CODECs and an MGE performs a transcoding operation, it is hard for the VCC UE to identify the voice data. In this case, the VCC UE should perform a switching operation by selecting appropriate voice data based on transmission delay of each access network, transcoding delay and jitter buffer status.

In an embodiment, an anchor point in an access network such as an MGW or a PGW operates like the VCC UE, a description of which follows.

The anchor point transmits transmission voice data, i.e., voice data received from the other party UE from a point in time at which two bearers are set up through the two bearers to the VCC UE. The anchor point simultaneously receives voice data from the two bearers and transmits only voice data received from one of the two bearers to other party UE. Here, a point in time at which the anchor point stops transmitting/receiving voice data in an old access network is determined according to whether a domain transfer operation is completed or whether voice data is valid.

In a case in which the anchor point transmits voice data, a point in time at which the anchor point stops transmitting voice data received from the other party UE through the old access point is basically a point in time at which a domain transfer operation has been completed; however, the anchor point may transmit voice data through the old access point during a time after the domain transfer operation has been completed by considering transmission delay of an access network.

In a case in which the anchor point receives voice data, the anchor point switches a path from the old bearer to the new bearer after receiving valid voice data through the new bearer. In an embodiment, a related bearer is a data bearer, so the anchor point may determine a packet received from the new bearer as voice data transmitted from the VCC UE even though the anchor point does not decode the packet received from the new bearer.

A point in time of a reception end of the anchor point may be set as one of a point in time at which the reception end of the anchor point starts receiving voice data from the new bearer, a point in time after a time from the point in time at which the reception end of the anchor point starts receiving the voice data from the bearer, and a point in time at which a domain transfer operation has been completed. The anchor point immediately transmits voice data received from the new bearer and transmits the received voice data to the other party UE if voice data reception through the old bearer is stopped.

For example, in a case in which a VCC UE currently receives a voice call service in a PS access network and the other party UE is a CS UE in another provider, an operation which is performed among the VCC UE and access networks if the VCC UE performs an operation according to a VCC scheme with a CS access network may be as follows.

1. The VCC UE detects that there is a need for switching a voice call, determines to transmit a domain transfer request, and transmits a set up message which requests call set up to the CS access network.
2. The CS access network transmits a message which requests a domain transfer to an IMS server, and proceeds to connect a CS call if the IMS server determines the domain transfer.
3. The VCC UE starts transmitting/receiving voice data if the VCC UE sets up a traffic channel with the CS access network. Since a domain transfer operation is performing, a bearer is not connected between the CS access network and the other party UE, so voice data input in the CS access network is invalid and voice data transmitted from the CS access network is discarded in the CS access network.
4. The IMS server performs a domain transfer process. If a new bearer is set up with the VCC UE, the CS access network informs the VCC UE that the new bearer is set up using a CS connect message. Since the new bearer is set up, an MGW simultaneously transmits voice data to two bearers. The VCC UE already transmits voice data through the CS access network, so voice data transmitted from the VCC UE is received through the new bearer. Voice data transmission/reception is performed on the two bearers between the VCC UE and the MGE.
5. The IMS server informs the VCC UE that the domain transfer operation has been completed through a SIP bye message.
6. The VCC UE and the MGW stop transmitting/receiving voice data through an old bearer at an appropriate point in time. The point in time at which voice data transmission/reception is stopped is described above, so a detailed description will be omitted.

In an embodiment, data flow change for a VCC UE according to processes 1 to 6, i.e., data flow change for the VCC UE in a mobile communication system according to an embodiment of the present disclosure will be described with reference to FIG. 8.

Figure 8:
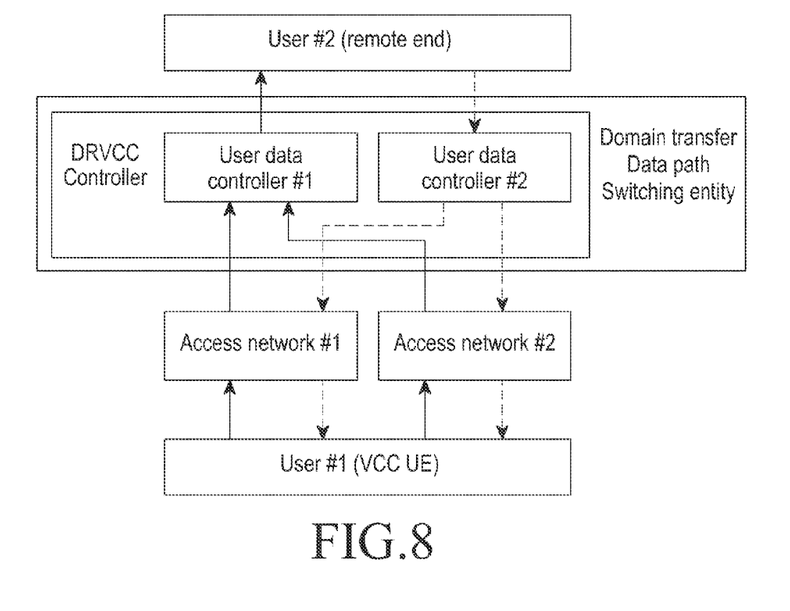
FIG. 8 schematically illustrates data flow change for a VCC UE in a mobile communication system according to an embodiment of the present disclosure.

FIG. 8 schematically illustrates data flow change for a VCC UE in a mobile communication system according to an embodiment of the present disclosure.

Referring to FIG. 8, the VCC UE detects that there is a need for switching a voice call while the VCC UE transmits/receives voice data through an access network #1, e.g., a PS access network, determines to transmit a domain transfer request, and transmits a set up message which requests call set up to a CS access network. The CS access network transmits a message which requests a domain transfer to a DRVCC controller, e.g., a user data controller #1 in an IMS server, and proceeds to connect a CS call if the user data controller #1 in the IMS server determines the domain transfer.

The VCC UE starts transmitting/receiving voice data if the VCC UE sets up a traffic channel with the CS access network. Since a domain transfer operation is performing, a bearer is not connected between the CS access network and the other party UE, so voice data input in the CS access network is invalid and voice data transmitted from the CS access network is discarded in the CS access network.

The IMS server performs a domain transfer process. If a new bearer is set up with the VCC UE, a user data controller #2 in the IMS server informs the VCC UE that the new bearer is set up using a CS connect message. Since the new bearer is set up, an MGW simultaneously transmits voice data to two bearers. The VCC UE already transmits voice data through the CS access network, so voice data transmitted from the VCC UE is received through the new bearer. Voice data transmission/reception is performed on the two bearers between the VCC UE and the MGE.

The user data controller #2 in the IMS server informs the VCC UE that the domain transfer operation has been completed through a SIP bye message.

The VCC UE and the MGW stop transmitting/receiving voice data through an old bearer at an appropriate point in time. The point in time at which voice data transmission/reception is stopped is described above, so a detailed description will be omitted.

Figure 9A:
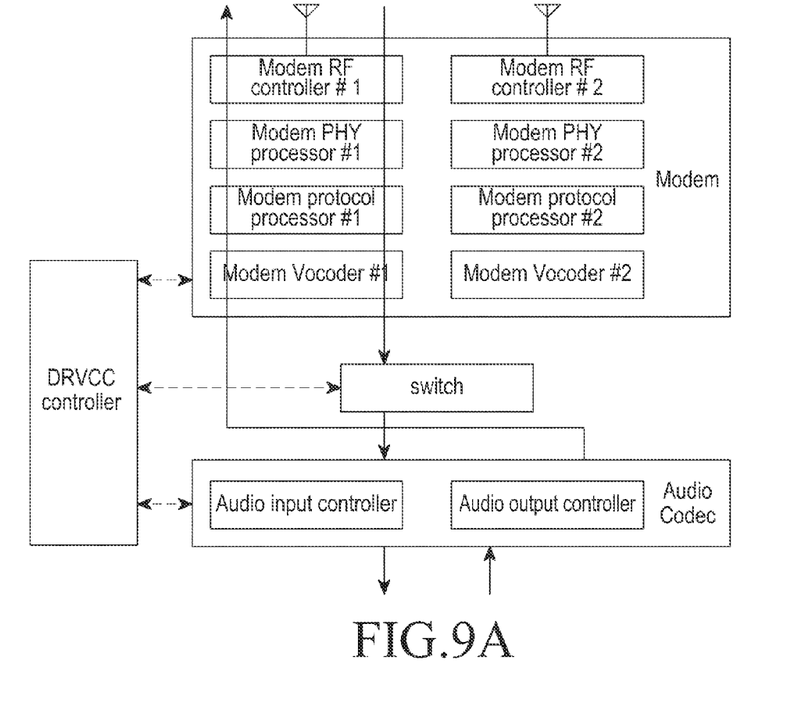
FIG. 9A schematically illustrates an initial status of a data flow for a VCC UE in a mobile communication system according to an embodiment of the present disclosure.

FIG. 9A schematically illustrates an initial status of a data flow for a VCC UE in a mobile communication system according to an embodiment of the present disclosure.

Referring to FIG. 9A, the VCC UE performs voice data transmission/reception operation through one access network, e.g., an access network #1, a description of which follows.

First, a description of a process for processing voice data transmitted from the VCC UE according to an embodiment of the present disclosure follows.

The voice data transmitted from the VCC UE is transferred to the other party UE through an audio input controller, a MODEM VOCODER #1, a MODEM protocol processor #1, a MODEM PHY processor #1, and a MODEM Radio Frequency (RF) controller #1.

Hereunder, a description of a process for processing voice data received in the VCC UE which is transmitted from the other party UE according to an embodiment of the present disclosure follows.

The voice data transmitted from the other party UE is transferred to the VCC UE through the MODEM RF controller #1, the MODEM PHY processor #1, the MODEM protocol processor #1, the MODEM VOCODER #1, the switch, and the audio output controller.

The audio input controller, the audio output controller, the MODEM RF controller #1, the MODEM PHY processor #1, the MODEM protocol processor #1, the MODEM VOCODER #1, and the switch perform a related operation under a control of the DRVCC controller.

Figure 9B:
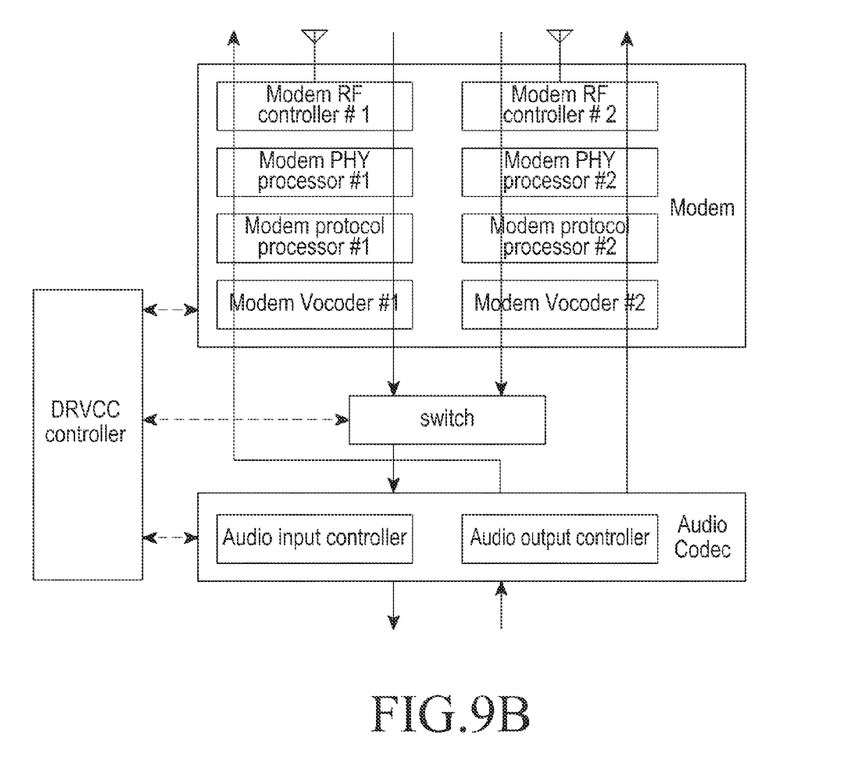
FIG. 9B schematically illustrates a status of a data flow for a VCC UE in a status on which a domain transfer operation has not been completed in a mobile communication system according to an embodiment of the present disclosure.

FIG. 9B schematically illustrates a status of a data flow for a VCC UE in a status on which a domain transfer operation has not been completed in a mobile communication system according to an embodiment of the present disclosure.

Referring to FIG. 9B, while the VCC UE performs a voice data transmission/reception operation through an access network, e.g., an access network #1, the VCC UE determines to perform the voice data transmission/reception operation through other access network, e.g., an access network #2. So, the VCC UE performs the voice data transmission/reception operation with the access network #1 and the access network #2 while a domain transfer operation is performing, a description of which follows.

First, a description of a process for processing voice data transmitted from the VCC UE according to an embodiment of the present disclosure follows.

Since the domain transfer operation is performing, the voice data transmitted from the VCC UE is transferred to the other party UE through an audio input controller, a MODEM VOCODER #1, a MODEM protocol processor #1, a MODEM PHY processor #1, and a MODEM RF controller #1. Further, since the domain transfer operation is performing, the voice data transmitted from the VCC UE is transferred to the other party UE through the audio input controller, a MODEM VOCODER #2, a MODEM protocol processor #2, a MODEM PHY processor #2, and a MODEM RF controller #2.

Finally, the voice data transmitted from the VCC UE is transferred through the access network #1 and the access network #2.

Secondly, a description of a process for processing voice data received in the VCC UE which is transmitted from the other party UE according to an embodiment of the present disclosure follows.

Since the domain transfer operation is performing, the voice data transmitted from the other party UE is transferred to the VCC UE through the MODEM RF controller #1, the MODEM PHY processor #1, the MODEM protocol processor #1, the MODEM VOCODER #1, a switch, and an audio output controller. Further, since the domain transfer operation is performing, the voice data transmitted from the other party UE is transferred to the VCC UE through the MODEM RF controller #2, the MODEM PHY processor #2, the MODEM protocol processor #2, the MODEM VOCODER #2, the switch, and the audio output controller.

Finally, the voice data transmitted from the other party UE is transferred through the access network #1 and the access network #2.

The audio input controller, the audio output controller, the MODEM RF controller #1, the MODEM PHY processor #1, the MODEM protocol processor #1, the MODEM VOCODER #1, the MODEM RF controller #2, the MODEM PHY processor #2, the MODEM protocol processor #2, the MODEM VOCODER #2, and the switch perform a related operation under a control of the DRVCC controller.

Figure 9C:
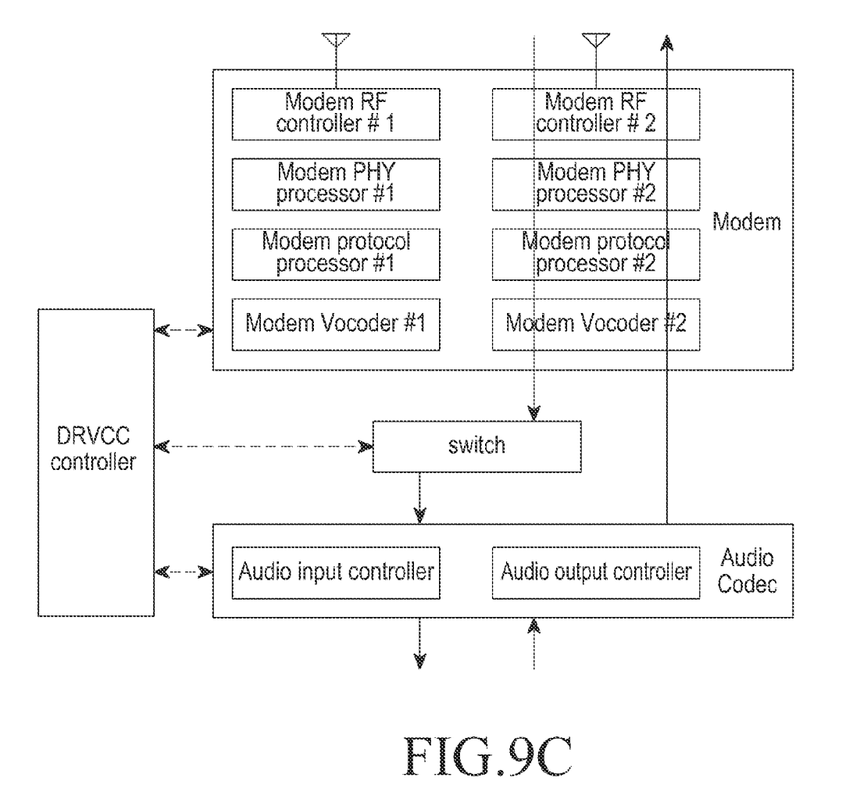
FIG. 9C schematically illustrates a status of a data flow for a VCC UE in a case in which voice data transmission/reception is stopped through an old bearer after a domain transfer operation is completed in a mobile communication system according to an embodiment of the present disclosure.

FIG. 9C schematically illustrates a status of a data flow for a VCC UE in a case in which voice data transmission/reception is stopped through an old bearer after a domain transfer operation is completed in a mobile communication system according to an embodiment of the present disclosure.

Referring to FIG. 9C, if a domain transfer operation from an access network, e.g., an access network #1 to an access network, e.g., an access network #2, has been completed, the VCC UE performs voice data transmission/reception operation through the access network #2, a description of which follows.

First, a description of a process for processing voice data transmitted from the VCC UE according to an embodiment of the present disclosure follows.

The voice data transmitted from the VCC UE is transferred to the other party UE through an audio input controller, a MODEM VOCODER #2, a MODEM protocol processor #2, a MODEM PHY processor #2, and a MODEM RF controller #2.

Hereunder, a description of a process for processing voice data received in the VCC UE which is transmitted from the other party UE according to an embodiment of the present disclosure follows.

The voice data transmitted from the other party UE is transferred to the VCC UE through the MODEM RF controller #2, the MODEM PHY processor #2, the MODEM protocol processor #2, the MODEM VOCODER #2, a switch, and an audio output controller.

The audio input controller, the audio output controller, the MODEM RF controller #2, the MODEM PHY processor #2, the MODEM protocol processor #2, the MODEM VOCODER #2, and the switch perform a related operation under a control of the DRVCC controller.

In an embodiment, a domain transfer operation from an IMS domain to a CS domain according to an embodiment of the present disclosure will be described with reference to FIG. 5, and a domain transfer operation from the CS domain to the IMS domain according to an embodiment of the present disclosure will be described with reference to FIG. 6.

Figure 5:
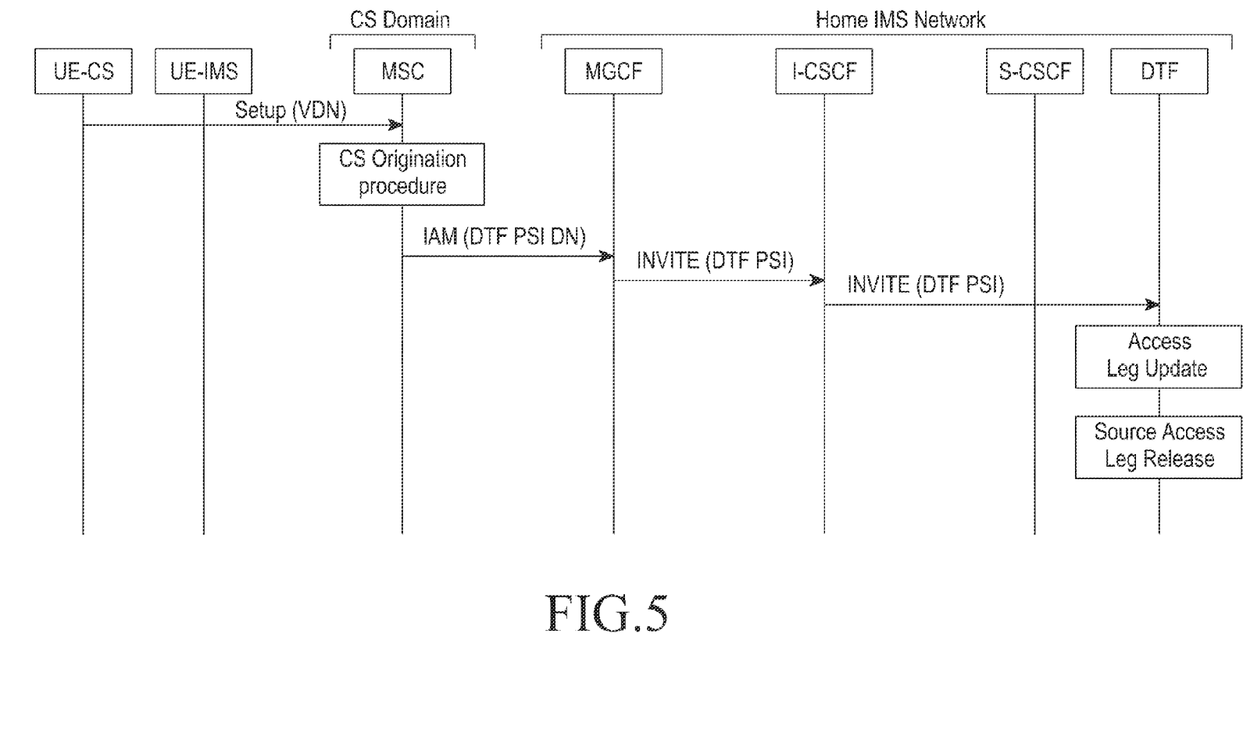
FIG. 5 schematically illustrates a domain transfer operation from an IMS domain to a CS domain in a mobile communication system according to an embodiment of the present disclosure.

FIG. 5 schematically illustrates a domain transfer operation from an IMS domain to a CS domain in a mobile communication system according to an embodiment of the present disclosure.

Referring to FIG. 5, the mobile communication system includes a UE-CS/UE-IMS, an MSC, an MGCF entity, an Interrogating-CSCF (I-CSCF) entity, an S-CSCF entity, and a DTF entity. The MSC is included in a CS domain, and the MGCF entity, the I-CSCF entity, the S-CSCF entity, and the DTF entity are included in an IMS domain.

Since the domain transfer operation from the IMS domain to the CS domain is performed, a UE-CS transmits a set up message including a VCC Domain transfer Number (VDN) to the MSC. After receiving the set up (VDN) message from the UE-CS, the MSC performs a CS originating procedure and transmits an Integrated Services Digital Network User Part (ISUP) Initial Address Message (IAM) message to the MGCF entity. The IAM message includes a DTF Public Service Identifier (PSI) Directory Number (DN).

After receiving the IAM (DTF PSI DN) message from the MSC, the MGCF entity transmits an INVITE message including a DTF PSI to the I-CSCF entity. After receiving the INVITE (DTF PSI) message, the I-CSCF entity transmits the INVITE (DTF PSI) message to the DTF entity. The DTF entity performs an access leg update operation and a source access leg release operation.

Figure 6:
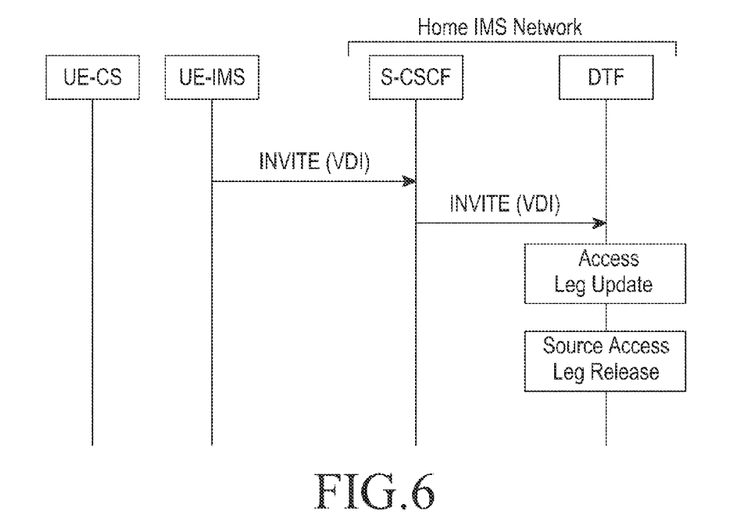
FIG. 6 schematically illustrates a domain transfer operation from a CS domain to an IMS domain in a mobile communication system according to an embodiment of the present disclosure.

FIG. 6 schematically illustrates a domain transfer operation from a CS domain to an IMS domain in a mobile communication system according to an embodiment of the present disclosure.

Referring to FIG. 6, the mobile communication system includes a UE-CS/UE-IMS, an S-CSCF entity, and a DTF entity. The S-CSCF entity and the DTF entity are included in an IMS domain.

Since the domain transfer operation from the CS domain to the IMS domain is performed, a UE-IMS transmits an INVITE message including a VDI to the S-CSCF entity. After receiving the INVITE (VDI) message from the UE-IMS, the S-CSCF entity transmits an INVITE (VDI) message to the DTF entity. After receiving the INVITE (VDI) message from the S-CSCF entity, the DTF entity performs an access leg update operation and a source access leg release operation.

Figure 7:
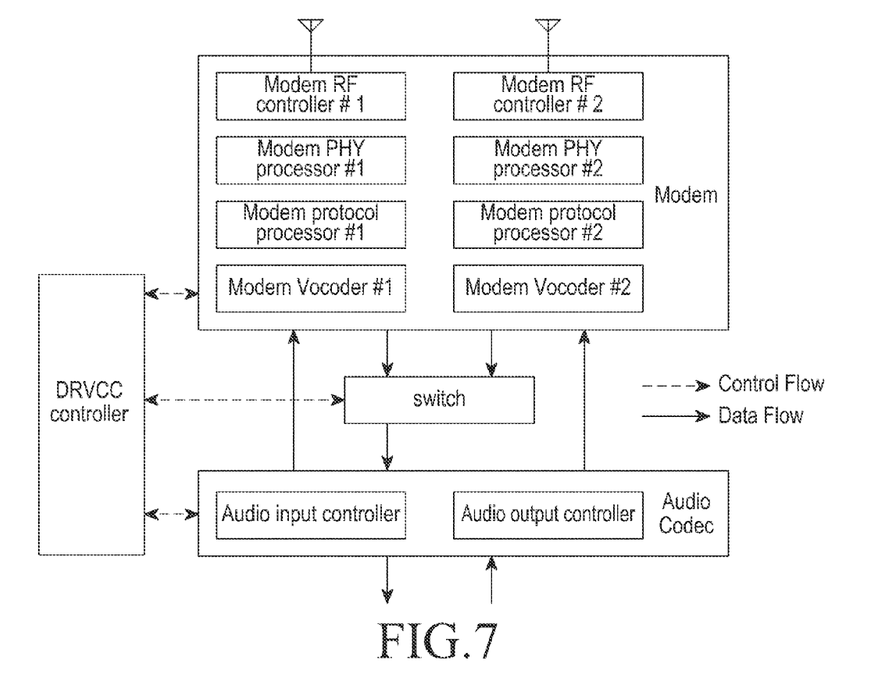
FIG. 7 schematically illustrates an inner structure of a VCC UE in a mobile communication system according to an embodiment of the present disclosure.

FIG. 7 schematically illustrates an inner structure of a VCC UE in a mobile communication system according to an embodiment of the present disclosure.

Referring to FIG. 7, the inner structure of the VCC UE is described above, so a detailed description will be omitted herein.

In order to obtain an optimal effect, an embodiment of the present disclosure may be simultaneously applied to both a VCC UE and an access network. However, it will be understood by those of ordinary skill in the art that it is also effective that an embodiment of the present disclosure is applied to one of the VCC UE and the access network.

An embodiment of the present disclosure may not be applied to some cases since there is a need for modifying an access network as well as a VCC UE, so an embodiment of the present disclosure may be applied according to a kind of the other party UE and a kind of a provider as follows.

1. If the other party UE is a CS UE or an IMS UE in the same provider, an embodiment of the present disclosure is applicable since an anchor point is an MGW of a related provider or a core network of an IP-CAN for a PGW and a GGSN.
2. If the other party UE is a CS UE in other provider or a wired terminal, an embodiment of the present disclosure is applicable since an anchor point is an MGW of an access provider.
3. If the other party UE is an IMS UE in other provider, an anchor point is a core network of an IP-CAN in the other provider, so an embodiment of the present disclosure may be restrictively applied to a VCC UE if a network of a related provider does not apply an embodiment of the present disclosure.

As is apparent from the foregoing description, an embodiment of the present disclosure enables to minimize a voice clipping interval by minimizing voice data loss which occurs during a VCC operation thereby preventing voice quality degradation. In this case, an embodiment of the present disclosure enables to enhance total service quality for a mobile communication system thereby increasing user's satisfaction.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for switching a call by a User Equipment (UE) supporting a Voice Call Continuity (VCC) scheme in a mobile communication system, the method comprising:

detecting, using a Dual Radio Voice Call Continuity (DRVCC) controller of the UE, that there is a need for switching a voice call from a first access network to a second access network that is different from the first access network while the UE supporting the VCC scheme transmits and receives data in the first access network through an old bearer which is set up with another party UE;

performing a new bearer set up operation with the second access network; and transmitting and receiving voice data with the other party UE through the old bearer in the first access network and transmitting and receiving voice data with the other party UE through the new bearer in the second access network until a point in time, wherein the voice data is transmitted and received between the UE and the other party UE on the first access network and the second access network until the point in time, and wherein the UE selects from among the voice data received from the first access network and the voice data received from the second access network based upon one or more criteria.

2. The method of claim 1, further comprising:

stopping transmitting and receiving the voice data with the other party UE through the old bearer in the first access network at the point in time.

3. The method of claim 1, wherein the detecting that there is the need for switching the voice call from the first access network to the second access network that is different from the first access network while the UE supporting the VCC scheme transmits and receives data in the first access network through the old bearer which is set up with the other party UE comprises:

detecting that the VCC UE should perform a domain transfer operation from the first access network to the second access network.

4. The method of claim 1, wherein the performing the new bearer set up operation with the second access network comprises:

transmitting a message which requests a domain transfer to an Internet Protocol (IP) Multimedia Subsystem (IMS) server; and receiving a message indicating that the new bearer has been set up according to the domain transfer request from the IMS server.

5. The method of claim 1, wherein the point in time is one of a point in time at which the new bearer set up operation has been completed and a point in time after a time from the point in time at which the new bearer set up operation has been completed.

6. The method of claim 1, wherein the point in time is determined by considering a transmission delay of the second access network.

7. The method of claim 1, wherein the point in time is selected by the UE based upon at least one of a type of access network of the first access network and a type of access network of the second access network.

8. A User Equipment (UE) supporting a Voice Call Continuity (VCC) scheme in a mobile communication system, the UE comprising:

a Dual Radio Voice Call Continuity (DRVCC) controller configured to detect that there is a need for switching a voice call from a first access network to a second access network that is different from the first access network while the UE supporting the VCC scheme transmits and receives data in the first access network through an old bearer which is set up with another party UE; and a MOdulator/DEModulator (MODEM) configured to perform a new bearer set up operation with the second access network, and to transmit and receive voice data with the other party UE through the old bearer in the first access network and to transmit and receive voice data with the other party UE through the new bearer in the second access network until a point in time, wherein the voice data is transmitted and received between the UE and the other party UE on the first access network and the second access network until the point in time, and wherein the UE selects from among the voice data received from the first access network and the voice data received from the second access network based upon one or more criteria.

9. The UE of claim 8, wherein the MODEM stops transmitting and receiving the voice data with the other party UE through the old bearer in the first access network at the point in time.

10. The UE of claim 8, wherein the DRVCC controller detects that the VCC UE should perform a domain transfer operation from the first access network to the second access network.

11. The UE of claim 8, wherein the MODEM transmits a message which requests a domain transfer to an Internet Protocol (IP) Multimedia Subsystem (IMS) server, and receives a message indicating that the new bearer has been set up according to the domain transfer request from the IMS server.

12. The UE of claim 8, wherein the point in time is one of a point in time at which the new bearer set up operation has been completed and a point in time after a time from the point in time at which the new bearer set up operation has been completed.

13. The UE of claim 12, wherein the point in time is determined by considering transmission delay of the second access network.

14. The UE of claim 8, wherein the point in time is selected by the UE based upon at least one of a type of access network of the first access network and a type of access network of the second access network.

* * * * *